US009006643B2

United States Patent
Lin

(10) Patent No.: US 9,006,643 B2
(45) Date of Patent: Apr. 14, 2015

(54) PHOTOELECTRIC CONVERTER WITH OPTICAL SIGNAL SPLITTING HOLES FOR REFLECTING OPTICAL SIGNALS TO MONITOR

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 260 days.

(21) Appl. No.: 13/495,257

(22) Filed: Jun. 13, 2012

(65) Prior Publication Data

US 2013/0161495 A1 Jun. 27, 2013

(30) Foreign Application Priority Data

Dec. 26, 2011 (TW) .............................. 100148496 A

(51) Int. Cl.
| | | |
|---|---|---|
| *G02B 6/26* | (2006.01) | |
| *G01J 1/02* | (2006.01) | |
| *G01J 1/04* | (2006.01) | |
| *G02B 6/42* | (2006.01) | |
| *G01J 1/42* | (2006.01) | |

(52) U.S. Cl.
CPC .............. *G01J 1/0271* (2013.01); *G01J 1/0204* (2013.01); *G01J 1/0411* (2013.01); *G01J 1/0425* (2013.01); *G01J 1/0451* (2013.01); *G01J 2001/4247* (2013.01); *G02B 6/4214* (2013.01); *G02B 6/423* (2013.01)

(58) Field of Classification Search
USPC .............. 250/227.11, 227.24; 385/14, 16–24, 385/31–36, 39, 42, 47, 92–94
See application file for complete search history.

(56) References Cited

U.S. PATENT DOCUMENTS

| | | | |
|---|---|---|---|
| 6,385,374 B2 * | 5/2002 | Kropp ............................. | 385/47 |
| 7,184,669 B2 * | 2/2007 | Gordon ......................... | 398/138 |
| 2008/0144032 A1 * | 6/2008 | Miyamae ...................... | 356/432 |
| 2008/0226228 A1 * | 9/2008 | Tamura et al. .................. | 385/33 |

\* cited by examiner

*Primary Examiner* — Francis M Legasse, Jr.
(74) *Attorney, Agent, or Firm* — Novak Druce Connolly Bove + Quigg LLP

(57) ABSTRACT

A photoelectric converter includes a circuit board, a laser diode, a plurality of optical sensors mounted on the circuit board, a transmission body, and a first lens set, a second lens set, and a plurality of optical fibers mounted on the transmission body. The transmission body defines a reflection groove and a plurality of optical signal splitting holes. A first sidewall of the reflection groove is inclined relative to the transmission direction of the optical signals. A bottom surface of each optical signal splitting hole is inclined relative to the first sidewall and to the second surface. The optical signals transmitted by the first lens set are reflected by the first sidewall. Most of the reflected optical signals are transmitted to the optical fibers via the second lens set, and a small remaining portion of optical signals are reflected by the bottom surface to the optical sensors.

13 Claims, 4 Drawing Sheets

PHOTOELECTRIC CONVERTER WITH OPTICAL SIGNAL SPLITTING HOLES FOR REFLECTING OPTICAL SIGNALS TO MONITOR

BACKGROUND

1. Technical Field

The present disclosure relates generally to photoelectric conversion, especially to a photoelectric converter.

2. Description of Related Art

A photoelectric converter may include a laser diode for emitting optical signals, an optical transmission assembly, and a photo diode. The optical signals emitted from the laser diode may be transmitted to the photo diode via the optical transmission assembly, and to be finally converted into electrical signals by the photo diode.

The performance of the signal transmission system of the photoelectric converter may be monitored by an eye diagram. However, when the bandwidth of the optical signals is relatively wide, or in other words, when the laser diode emits optical signals of both higher and lower energy, the time domain distribution of the eye diagram becomes unstable. Thus, users may fail to satisfactorily test the performance of the signal transmission system of the photoelectric converter by means of an eye diagram performed on an oscilloscope, or to find the performance test very difficult to carry out.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
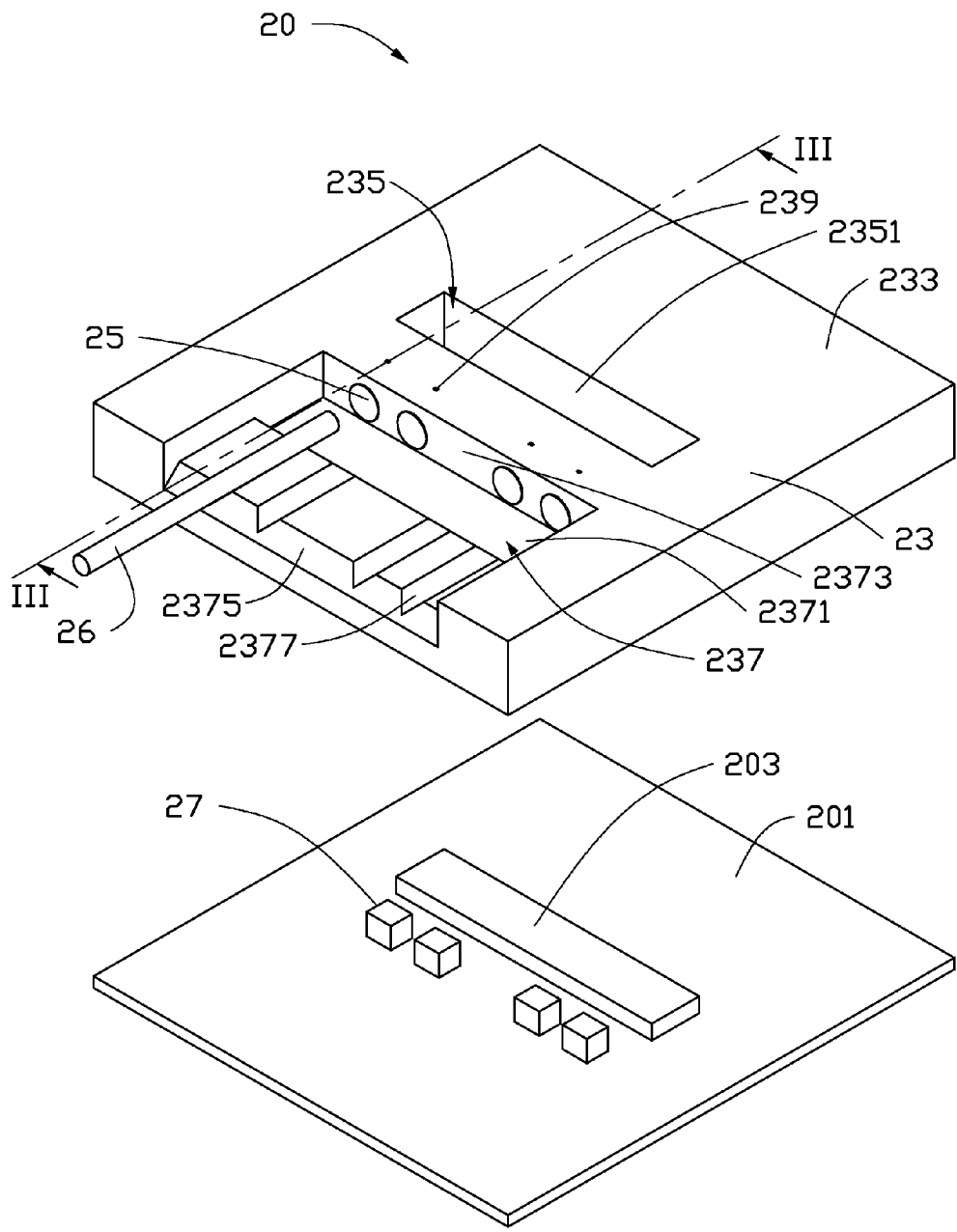
FIG. 1 is an exploded, isometric view of one embodiment of a photoelectrical converter.
Figure 2:
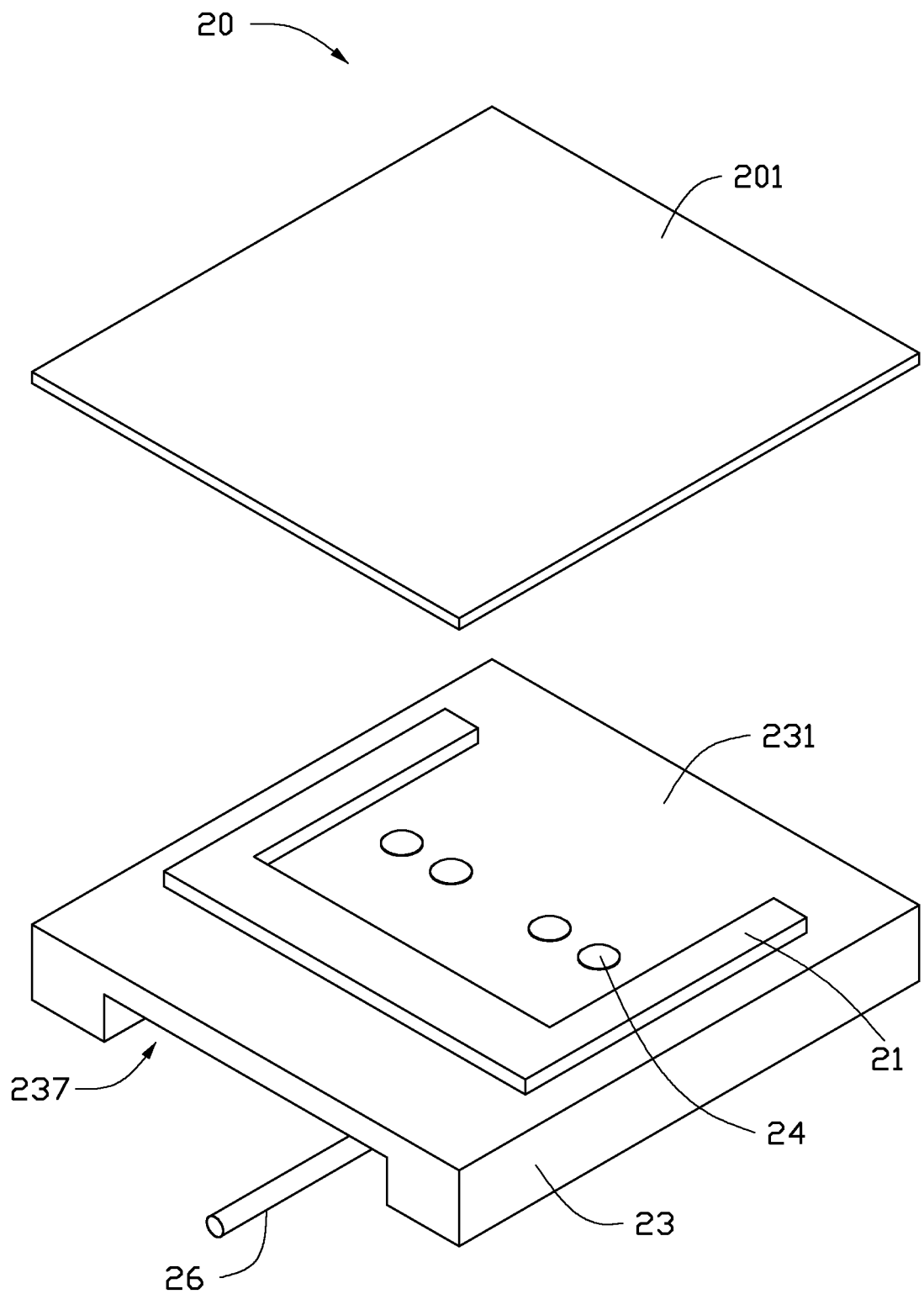
FIG. 2 is similar to FIG. 1, but viewed from another aspect.

FIGS. 1 and 2 show one embodiment of a photoelectric converter 20 including a circuit board 201, a laser diode 203, a supporting plate 21, a transmission body 23, a first lens set 24, a second lens set 25, a plurality of optical fibers 26 and a plurality of optical sensors 27. The laser diode 203 and the optical sensors 207 are mounted on the circuit board 201, and are electrically connected to the circuit board 201. The laser diode 203 can emit light in the form of digital signals (optical signals). The supporting plate 21 is positioned above the circuit board 201, and supports the transmission body 23, to allow the transmission body 23 to be positioned above the laser diode 203 and the optical sensors 27, respectively. The first lens set 24 and the second lens set 25 are fixed within the transmission body 23, for collimating the optical signals. The transmission body 23 transmits the optical signals. The optical fibers 26 are inserted in the transmission body 23, and are coupled with the second lens set 25, for transmitting the optical signals. The photoelectric converter 20 further includes a plurality of functional modules (not shown) and other components (not shown), such as a photo diode for example, but, for simplicity, the functional modules and other components are not described herein.

Figure 3:
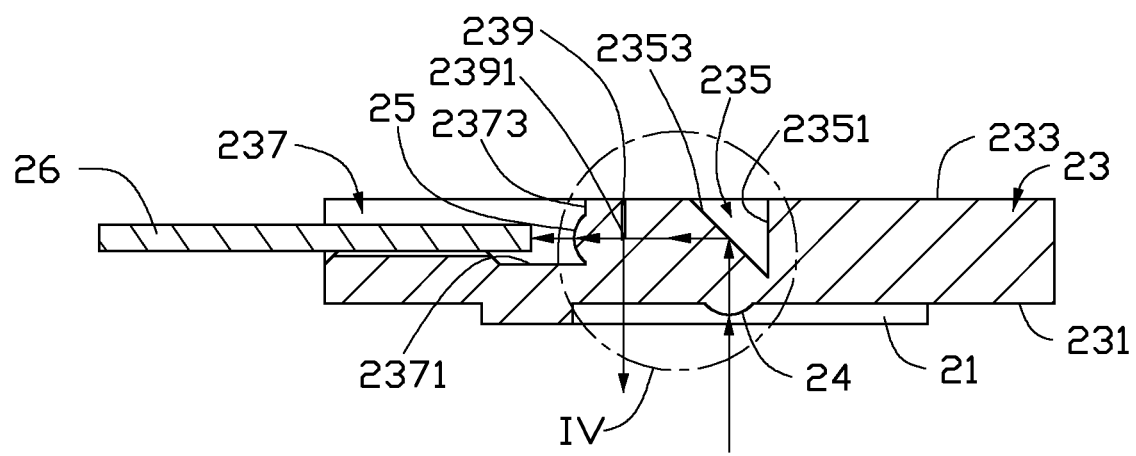
FIG. 3 is a sectional view take along line III-III shown in FIG. 1
Figure 4:
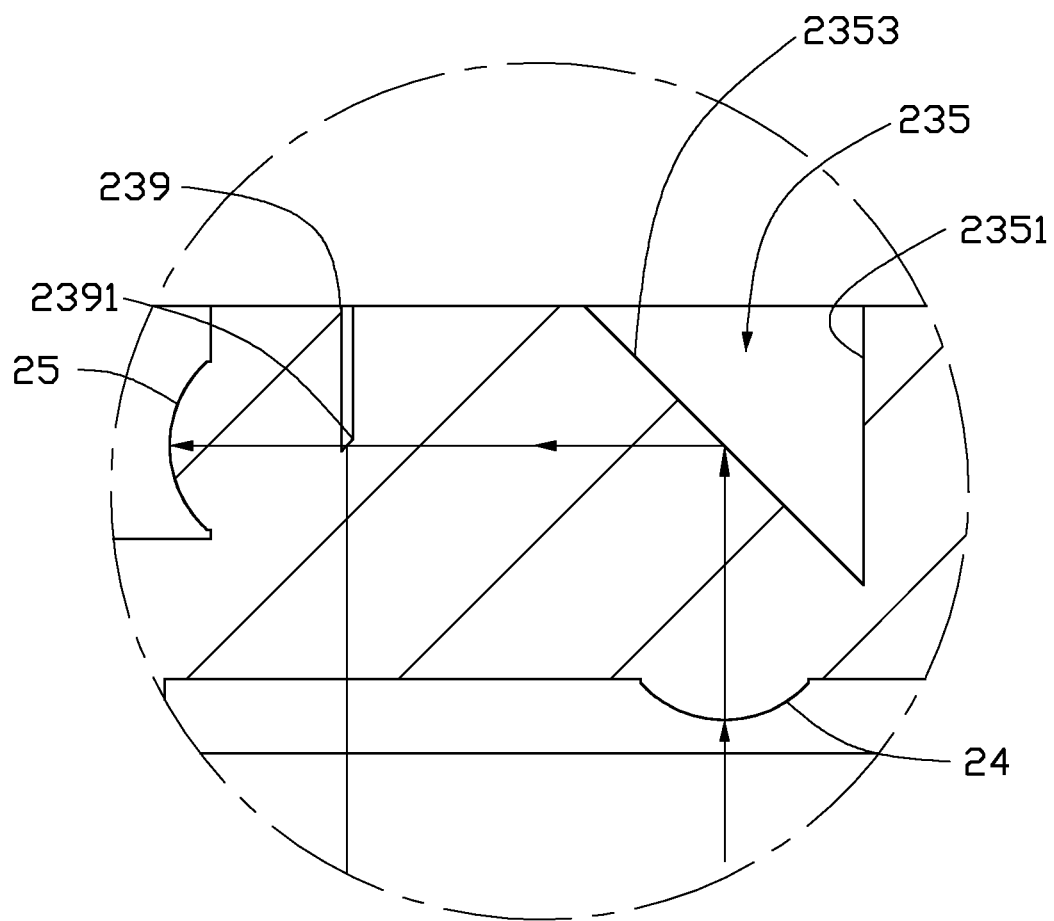
FIG. 4 is an enlarged, isometric view of circled portion IV of FIG. 3.

FIGS. 3 and 4 show the transmission body 23 including a first surface 231 facing the circuit board 201 and a second surface 233 opposite to the first surface 231 thereof. The first lens set 24 is mounted on the first surface 231, for collimating the optical signals emitted from the laser diode 203.

The transmission body 23 defines a reflection groove 235, a mounting groove 237 and a plurality of optical signal splitting holes 239 at the second surface 233. The reflection groove 235 is positioned at a substantially middle portion of the second surface 233, and the reflection groove 235 is aligned with the laser diode 203. The mounting groove 237 is defined at an end of the second surface 233, for mounting the second lens set 25 and the optical fibers 26. The optical signal splitting holes 239 are defined between the reflection groove 235 and the mounting groove 237, and are aligned with the optical sensors 27, to allow a portion of optical signals to be reflected to the optical sensors 27 for monitoring the amount of optical signal energy.

The reflection groove 235 is substantially a bar-shaped groove, and the cross-section thereof is substantially triangular. A first sidewall 2353 of the reflection groove 235 intersects with a second sidewall 2351 of the reflection groove 235. The first sidewall 2353 is inclined relative to the direction of the optical signals emitted by the laser diode 203. In the illustrated embodiment, the second sidewall 2351 is perpendicular to the first surface 231. An included angle between the first sidewall 2353 and the first surface 231 is 45 degrees. The transmission body 23 is made of material with a high reflective index, for allowing the optical signals to be totally reflected by the first sidewall 2353. In other embodiments, the first sidewall 2353 can be a reflective coating, for achieving total reflection of the optical signals.

The mounting groove 237 is substantially rectangular, and is positioned at an end of the transmission body 23 adjacent to the optical signal splitting holes 239. The optical fibers 26 are mounted on a bottom surface 2371 of the mounting groove 237. The second lens set 25 is fixed at a sidewall 2373 of the mounting groove 237 adjacent to the first sidewall 2353, for collimating the optical signals reflected by the first sidewall 2353. In the illustrated embodiment, the sidewall 2373 is parallel to the second sidewall 2351.

The transmission body 23 forms a mounting portion 2375 at an end of the bottom surface 2371 away from the sidewall 2373. The mounting portion 2375 is substantially cuboid, and defines a plurality of receiving grooves 2377 at a surface thereof opposite to the bottom surface 2371. The receiving grooves 2377 are V-shaped, for receiving the optical fibers 26. In other embodiment, the receiving grooves 2377 can be other shapes, such as trapezoidal for example.

The optical signal splitting holes 239 are located between the second lens set 25 and the first sidewall 2353, for allowing a portion of the optical signals to reach the optical sensors 27. The optical signal splitting holes 239 are substantially a plurality of slots. A bottom surface 2391 of each optical signal splitting hole 239 is an inclined surface relative to the second surface 233 and also relative to the first sidewall 2353, and the bottom surface 2391 faces to the first sidewall 2353. The bottom surface 2391 reflects a portion of the optical signals reflected by the first sidewall 2353 to the optical sensors 27. The area of the bottom surface 2391 is smaller than the area of the second lens set 25, so as to allow only a small portion of the optical signals to be reflected by the bottom surface 2391, thus avoiding an inordinate or excessive loss of the optical signal. In the illustrated embodiment, the bottom surface 2391 is perpendicular to the first sidewall 2353, to make the optical signals reflected by the bottom surface 2391 transmitted through in the transmission body 23 to travel parallel to those optical signals before reflection by the first sidewall 2353. In another embodiment, the included angle between the bottom surface 2391 and the first sidewall 2353 can be of any angle between 45 degrees and 135 degrees.

The optical fibers 26 are received and fixed in the receiving groove 2377 by means of optical cement (not shown), and the optical fibers 26 are coupled with the lens of the second lens set 25, respectively, for transmitting optical signals.

The optical sensors 27 are mounted on the circuit board 201, and sense the optical signals reflected by the bottom surface 2391. The circuit board 201 monitors the laser optical signal energy detected by means of the optical sensors 27, and then feeds back the detected laser optical signal energy to the laser diode 203.

In the illustrated embodiment, each lens of the second lens set 25 and the lens of the first lens set 24 are substantially coplanar and perpendicular to the first surface 231. The first lens set 24 and the second lens set 25 are a plurality of convex condenser lenses. There are four lenses of the first lens set 24, four lenses of the second lens set 25, and four optical signal splitting holes 239.

In use, the laser diode 203 emits optical signals, and the first lens set 24 collimates the optical signals to the transmission body 23. The optical signals are totally reflected by the first sidewall 2353 to be transmitted parallel to the first surface 231, and the majority portion of the reflected optical signals are collimated by the second lens set 25 to be transmitted to the optical fibers 26, and a small proportion of the reflected optical signals are further reflected by the bottom surface 2391 to be transmitted to the optical sensors 27. The circuit board 201 monitors the amount of optical signal energy detected according to the optical sensors 27, and then feeds back the optical signal energy to the laser diode 203.

In another embodiment, the sidewall 2373 can be inclined relative to the second sidewall 2351, and the included angle between the first sidewall 2353 and the second sidewall 2351 should be arranged and configured suitably, to allow the optical signals totally reflected by the first sidewall 2353 to be transmitted to the second lens set 25. The optical fibers 26 can be mounted on another part of the photoelectric converter 20 to be engaged with the transmission body 23, and coupled with the second lens set 25 for transmitting the optical signals.

The optical signal splitting holes 239 disposed between the reflection groove 235 and the second lens set 25 in the transmission body 23 allow the optical signals totally reflected by the first sidewall 2353 to be split into two parts or portions. The larger portion of the reflected optical signals are collimated by the second lens set 25 to be transmitted to the optical fibers 26, and the smaller portion of the reflected optical signals are further reflected by the bottom surface 2391 to be transmitted to the optical sensors 27. The circuit board monitors the amount of signal energy according to the optical sensors 27, and then feeds back the measured or detected amount of signal energy to the laser diode 203, to enable the laser diode 203 to emit optical signals in a stable manner. Thus an eye diagram of the photoelectric converter 20 becomes useful and worthwhile for satisfactorily testing performance of the signal transmission system of the photoelectric converter 20.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A photoelectric converter, comprising:
a circuit board;
a laser diode mounted on the circuit board, for emitting a plurality of optical signals;
a supporting plate positioned above the circuit board;
a transmission body mounted on the supporting plate, comprising a first surface and a second surface opposite to the first surface, the transmission body defining a reflection groove and a plurality of optical signal splitting holes adjacent to the reflection groove at the second surface of the transmission body, a first sidewall of the reflection groove inclined relative to a transmission direction of the optical signals emitted by the laser diode, a bottom surface of each optical signal splitting hole inclined relative to the second surface, and the bottom surface facing to the first sidewall;
a first lens set mounted on the first surface of the transmission body, and aligned with the laser diode, for collimating the optical signals emitted by the laser diode;
a second lens set mounted on the transmission body adjacent to the optical signal splitting holes, for transmitting and collimating the optical signals;
a plurality of optical fibers coupling with the second lens set; and
a plurality of optical sensors mounted on the circuit board, and aligned with the optical signal splitting holes,
wherein the optical signals transmitted by the first lens set are reflected by the first sidewall of the reflection groove, and are transmitted in the transmission body; a majority portion of the reflected optical signals by the first sidewall are collimated by the second lens set to be transmitted to the optical fibers, and a small proportion of the reflected optical signals are further reflected by the bottom surface of each optical signal splitting hole to be transmitted to the optical sensors; the circuit board monitors the amount of optical signal energy detected according to the optical sensors, and then feedbacks the detected signal energy to the laser diode;
wherein the optical signal splitting hole is a slot; and the area of the bottom sidewall is smaller than the area of the corresponding lens of the second lens set.

2. The photoelectric converter of claim 1, wherein the optical signal splitting holes are positioned between the reflection groove and the second lens set, and the optical fibers face the second lens set.

3. The photoelectric converter of claim 1, wherein the transmission body defines a mounting groove at the second surface thereof adjacent to the optical signal splitting holes; the second lens set is mounted on a sidewall of the mounting groove adjacent to the optical signal splitting holes; the optical fibers are mounted on a bottom surface of the mounting groove, and are coupled with the second lens set.

4. The photoelectric converter of claim 3, wherein the transmission body forms a mounting portion at the bottom surface of the mounting groove, the mounting portion defines a plurality of receiving grooves at a surface thereof opposite to the bottom surface of the mounting groove; the optical fibers are received in the receiving grooves.

5. The photoelectric converter of claim 4, wherein the receiving grooves are a plurality of V-shaped grooves.

6. A photoelectric converter, comprising:
a circuit board;
a laser diode mounted on the circuit board, for emitting a plurality of optical signals;
a supporting plate positioned above the circuit board;

a transmission body mounted on the supporting plate, comprising a first surface and a second surface opposite to the first surface, the transmission body defining a reflection groove and a plurality of optical signal splitting holes adjacent to the reflection groove at the second surface of the transmission body, a first sidewall of the reflection groove inclined relative to a transmission direction of the optical signals emitted by the laser diode, a bottom surface of each optical signal splitting hole inclined relative to the second surface, and the bottom surface facing to the first sidewall;

a first lens set mounted on the first surface of the transmission body, and aligned with the laser diode, for collimating the optical signals emitted by the laser diode;

a second lens set mounted on the transmission body adjacent to the optical signal splitting holes, for transmitting and collimating the optical signals;

a plurality of optical fibers coupling with the second lens set; and a plurality of optical sensors mounted on the circuit board, and aligned with the optical signal splitting holes, wherein the optical signals transmitted by the first lens set are reflected by the first sidewall of the reflection groove, and are transmitted in the transmission body; a majority portion of the reflected optical signals by the first sidewall are collimated by the second lens set to be transmitted to the optical fibers, and a small proportion of the reflected optical signals are further reflected by the bottom surface of each optical signal splitting hole to be transmitted to the optical sensors; the circuit board monitors the amount of optical signal energy detected according to the optical sensors, and then feedbacks the detected signal energy to the laser diode;

wherein an included angle between the first sidewall of the reflection groove and the first surface of the transmission body is 45 degrees;

wherein the reflection groove is a groove having a triangular cross-section; a second sidewall of the reflection groove intersects with the first sidewall thereof; and the second sidewall is perpendicular to the first surface of the transmission body.

7. The photoelectric converter of claim 6, wherein the bottom surface of each optical signal splitting hole is perpendicular to the first sidewall of the reflection groove.

8. A photoelectric converter, comprising:

a circuit board;

a laser diode mounted on the circuit board, for emitting a plurality of optical signals;

a transmission body positioned above the circuit board, comprising a first surface and a second surface opposite to the first surface thereof, the transmission body defining a reflection groove and a plurality of optical signal splitting holes besides the reflection groove at the second surface thereof, a first sidewall of the reflection groove inclined relative to a transmission direction of the optical signals emitted by the laser diode, a bottom surface of each optical signal splitting hole inclined relative to the first sidewall of the reflection groove, and the bottom surface facing to the first sidewall;

a first lens set mounted on the first surface of the transmission body, and aligned with the laser diode, for collimating the optical signals emitted by the laser diode;

a second lens set mounted on the transmission body besides the optical signal splitting holes, for transmitting the optical signals;

a plurality of optical fibers coupling with the second lens set; and a plurality of optical sensors mounted on the circuit board, and aligned with the optical signal splitting holes, wherein the optical signals transmitted by the first lens set are reflected by the first sidewall of the reflection groove, and are transmitted through in the transmission body; a majority portion of the reflected optical signals are collimated by the second lens set to be transmitted to the optical fibers, and a small proportion of the reflected optical signals are further reflected by the bottom surface of each optical signal splitting hole to be transmitted to the optical sensors; the circuit board monitors the detected signal energy according to the optical signal sensor, and then feedbacks the detected signal energy to the laser diode;

wherein the optical signal splitting hole is a slot; the area of the bottom sidewall is smaller than the area of the corresponding lens of the second lens set; the transmission body defines a mounting groove at the second surface thereof besides the optical signal splitting holes; the second lens set is mounted on a sidewall of the mounting groove adjacent to the optical signal splitting holes; and the optical fibers are mounted on a bottom surface of the of the mounting groove, and are coupled with the second lens set.

9. The photoelectric converter of claim 8, wherein an included angle between the first sidewall of the reflection groove and the first surface of the transmission body is 45 degrees.

10. The photoelectric converter of claim 8, wherein the transmission body forms a mounting portion at the bottom surface of the mounting groove, the mounting portion defines a plurality of receiving grooves at a surface thereof opposite to the bottom surface of the mounting groove; the optical fibers are received in the receiving grooves.

11. The photoelectric converter of claim 9, wherein the reflection groove has a triangular groove in cross-section; a second sidewall of the reflection groove intersects with the first sidewall thereof; the second sidewall is perpendicular to the first surface of the transmission body.

12. The photoelectric converter of claim 9, wherein the bottom surface of each optical signal splitting hole is perpendicular to the first sidewall of the reflection groove.

13. The photoelectric converter of claim 10, wherein the receiving grooves are V-shaped grooves.

* * * * *